Nov. 15, 1966  R. R. DE ZURIK  3,285,266
PNEUMATIC BRIDGE FORCE TRANSDUCER
Filed Aug. 19, 1963  3 Sheets-Sheet 1
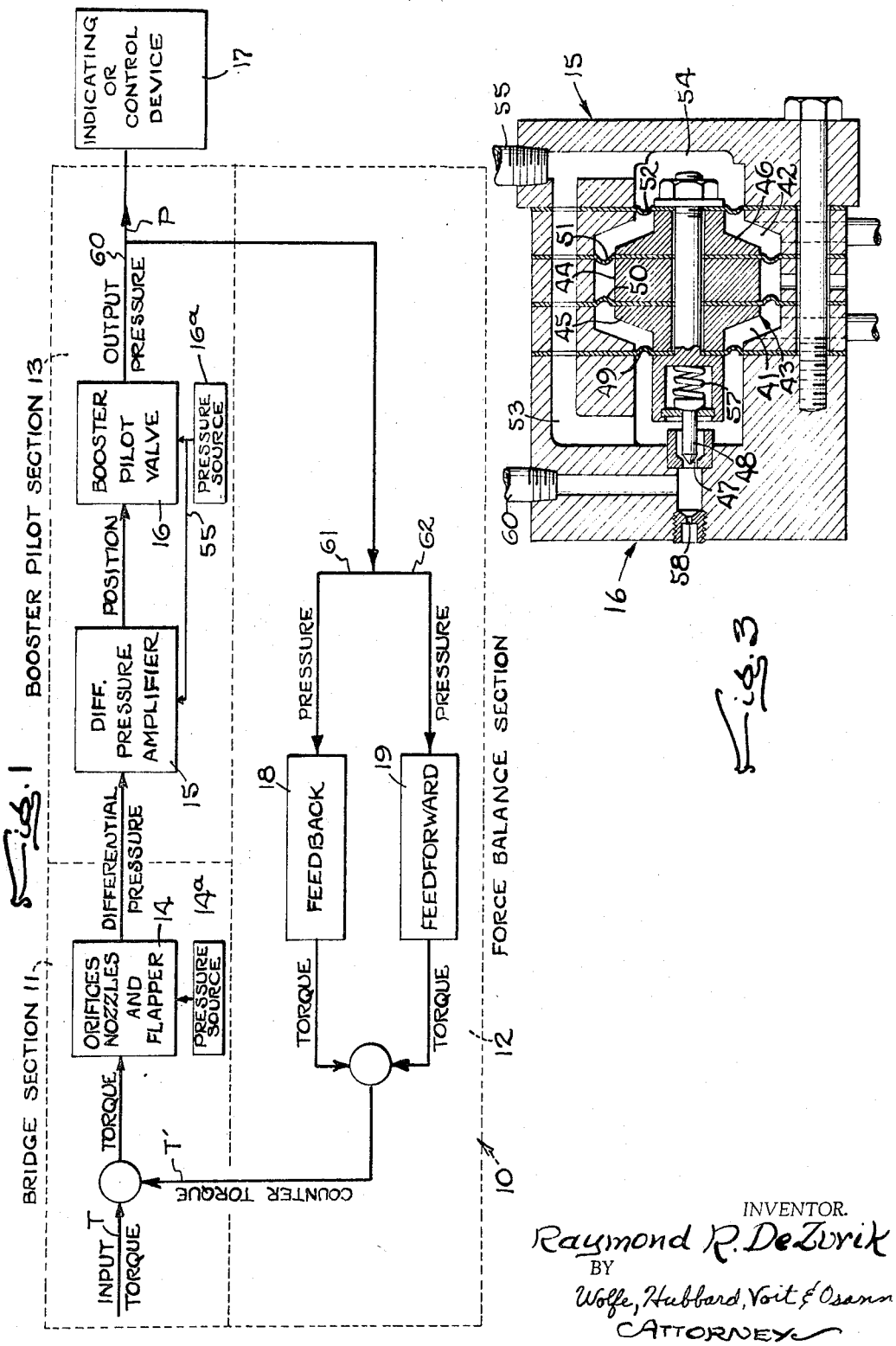
INVENTOR.
Raymond R. DeZurik
BY
Wolfe, Hubbard, Voit & Osann
ATTORNEYS

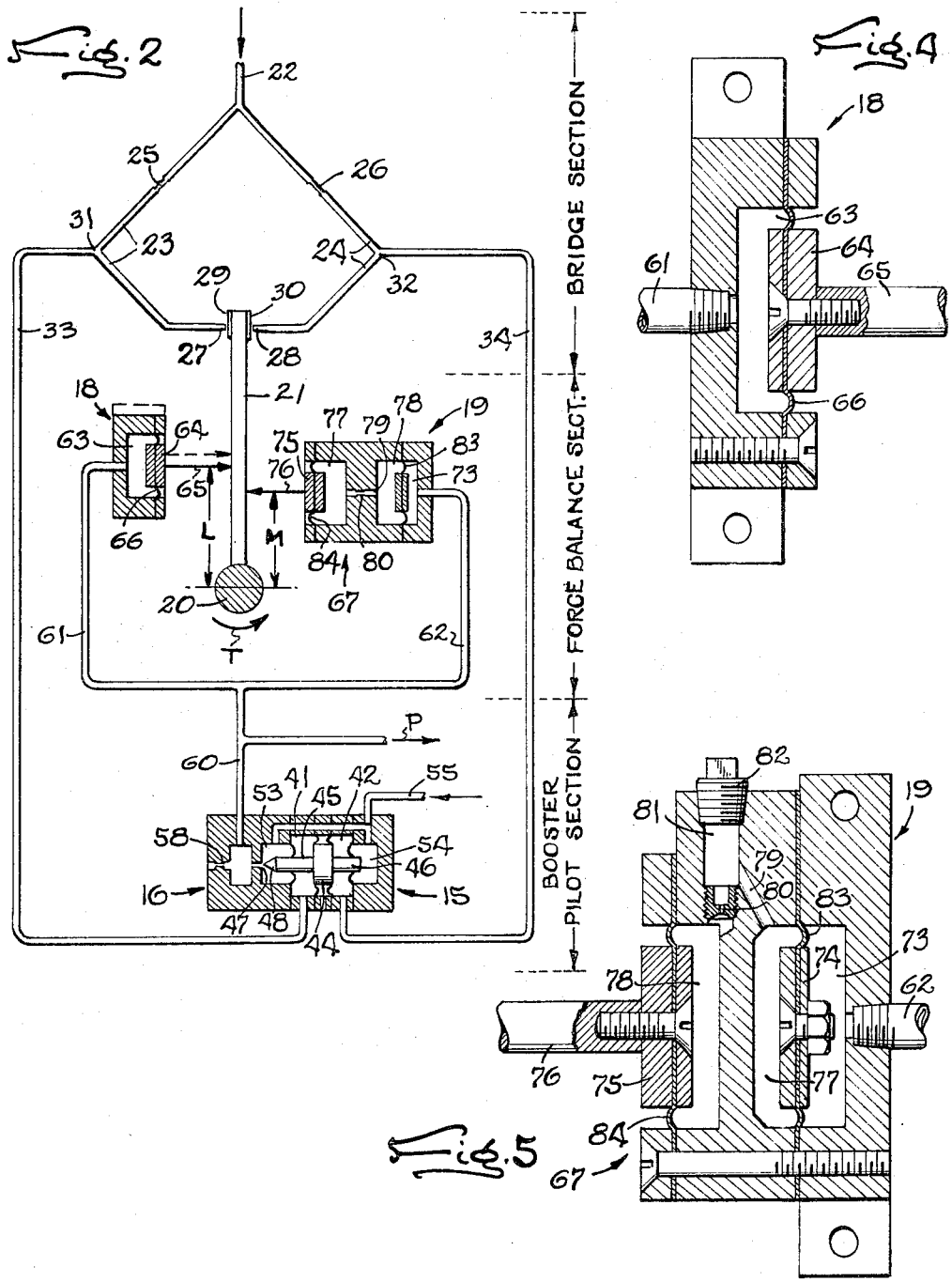

United States Patent Office 3,285,266
Patented Nov. 15, 1966

3,285,266
PNEUMATIC BRIDGE FORCE TRANSDUCER
Raymond R. de Zurik, St. Cloud, Minn., assignor to de Zurik Corporation, Sartell, Minn., a corporation of Minnesota
Filed Aug. 19, 1963, Ser. No. 303,055
4 Claims. (Cl. 137—86)

This invention relates generally to pneumatic transducers and more particularly concerns bridge-type force-to-pneumatic pressure transducers.

With the continued growth of automation in manufacturing techniques and process control systems, it has become extremely important to develop accurate and reliable readout devices for precisely indicating and regulating these automated machine functions. In the past, pneumatically controlled systems have been widely used for this purpose. Recently, however, electrical and electronic control systems have become widely accepted, and in many instances have replaced pneumatic control systems. Nevertheless, pneumatically operated control systems still have many advantages including: low cost, ease of maintenance, the ready availability of supply air, inherent safety and dependability.

Pneumatic control circuits, however, have one disadvantage that has no exact counterpart in electrical control circuits. This disadvantage arises due to contamination of the air supply and variations in the source of pneumatic pressure. Oil and water vapors are very difficult to remove from compressed air systems and these vapors tend to condense at points of moderate pressure drop. Thus, restrictions in the pneumatic control lines are susceptible to oil and water accumulation and such accumulations in nozzle-flapper combinations become even more critical than at other points of moderate pressure drop. Moreover, a film of oil building up on a nozzle seat will not only alter the pressure drop but also it tends to collect atmospheric dust thereby further altering the nozzle characteristics.

Accordingly, it is the primary aim of the present invention to provide a pneumatic force transducer that operates on a force balance principle and which is not susceptible to fouling and residue buildup caused by contaminated air.

It is another object to provide a pneumatic bridge force transducer that is capable of detecting very small forces and correspondingly small movements which because of the high gain of the transducer are capable of producing full excursion of the signal output.

A further object is to provide such a pneumatic bridge force transducer that is unaffected by temperature changes or air supply variations and which has very little hysteresis arising from surface friction of the moving parts. It is a more particular object to provide a pneumatic bridge force transducer of the above type which has a nearly linear output because the deviation from the null position is maintained at a minimum.

Still another object is to provide a pneumatic force transducer for use in a closed loop control circuit and which has a readout accuracy of essentially 100% between the input force and the output signal.

Other objects and advantages of the invention will become apparent upon reading the following detailed description and upon reference to the drawings in which:

FIGURE 1 is a schematic block diagram of the pneumatic bridge force transducer of the present invention;

FIG. 2 is a schematic pneumatic control circuit for the novel transducer shown in FIG. 1;

FIG. 3 is a more detailed cross section of the differential pressure amplifier;

FIG. 4 is a more detailed cross section of the negative feedback device;

FIG. 5 is a more detailed cross section of the positive feedback device and viscous damper;

Figure 6:
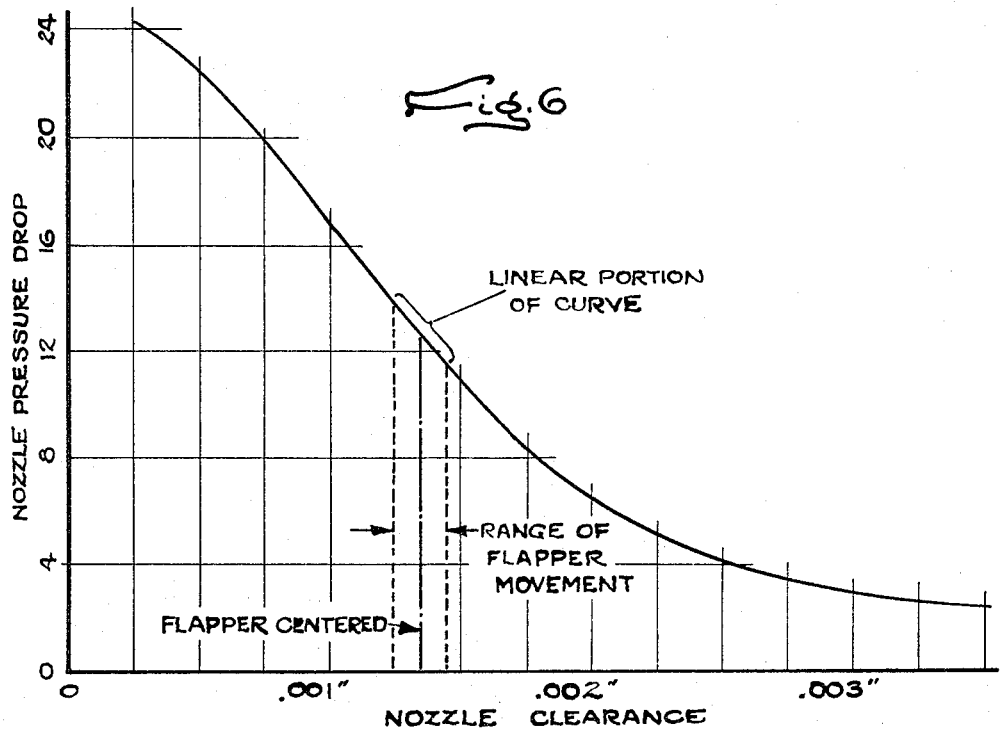
FIG. 6 is a graph illustrating pressure drop in relation to nozzle clearance for a typical direct nozzle transducer.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Turning now to the drawings, there is shown in FIGURE 1 a schematic block diagram of a pneumatic force transducer 10, embodying the present invention. Basically, the pneumatic force transducer 10 includes a bridge section 11, a force balance section 12 and a booster pilot section 13 as indicated by the dash line segments of FIG. 1. As illustrated here, the transducer 10 is utilized to produce an amplified pneumatic output signal P derived from an input torque T. In the illustrated embodiment, the transducer 10 operates on a force balance principle and the input torque T alters the normal equilibrium or balance condition in the bridge section 11 of the transducer. It will be understood, of course, that the transducer 10 can also be utilized with other types of input forces without departing from the teaching of the present invention.

As illustrated in the schematic block diagram of FIG. 1, the input torque T is detected by a nozzle and flapper unit 14 in which the deflection of the flapper is utilized to convert the pneumatic pressure delivered from a source 14a into a relatively low level differential pressure signal. This differential pressure signal is transmitted to a differential pressure amplifier unit 15 in the booster pilot section 13 of the transducer. Within the amplifier, the differential pressure produces a position change that is transmitted to a pilot valve 16. The resulting position change of the pilot valve alters the output signal P from a source 16a of relatively high level pneumatic pressure delivered to the valve. Thus, the differential pressure booster 15 together with the pilot valve 16 act as a pneumatic amplifier for the relatively low level signal delivered from the bridge section 11 of the transducer. The resulting high level output signal P, when delivered to a suitable indicating or control device 17, thereby provides a measure of the flapper deflection produced by the input torque T.

The output signal P from the booster pilot section 13 is also communicated to the force balance section 12 of the transducer 10. As seen in FIG. 1, the output pressure signal P is placed in communication with a negative feedback unit 18 and with a positive feedback unit 19, each of which convert their respective pressure signals into proportional physical forces, such as torque in the present instance. Preferably, the torque outputs from the negative feedback and positive feedback units are arranged to oppose one another and are resolved to produce a single resultant countertorque T'. The countertorque T' is then transmitted back to the bridge section 11 where it tends to balance the input torque T thereby returning the pneumatic bridge force transducer substantially to the original "null" or equilibrium condition. Thus, it will be appreciated that the illustrative pneumatic transducer 10 is a closed loop system with variable torque T as the input and variable pneumatic pressure P as the output signal.

A more detailed schematic circuit diagram of the pneumatic bridge force transducer 10 is shown in FIG. 2. As shown here, the input torque T acts about a pivot 20 with the torque tending to rotate an input arm 21 projecting radially from the pivot. The arm 21 thus serves as the input mechanism for the bridge section of the transducer 10.

Pursuant to the present invention, the angular movement of the input arm 21 due to the applied torque T is converted into a differential pressure signal which is amplified by the transducer 10 to produce the output signal P. For this purpose, pressurized air is delivered to the bridge section 11 of the pneumatic transducer 10 through a supply line 22 from the source of air pressure 14a, indicated in FIG. 1. As shown in FIG. 2, the supply line 22 divides into two separate but identical delivery lines 23 and 24 in which identical fixed orifices 25 and 26 and nozzles 27 and 28 are respectively installed. It will also be understood that each of the restrictions formed by the respective orifices 25, 26 and nozzles 27, 28, of course, creates a pressure drop thereacross.

The amount of the pressure drop at each of the restrictions 25–28 is dependent both upon the area of the restriction and the total air flow through the respective delivery lines 23, 24. In the illustrative embodiment, the nozzles 27, 28 are mounted in close proximity to but on opposite sides of the input arm 21 so that as the arm pivots with the element 20, the flow of air through one of the nozzles is further restricted. Preferably, the arm of "flapper" 21 is formed with a pair of nozzle seats 29 and 30 on its opposite sides for the respective nozzles 27, 28. Thus, as an input torque T is applied, the arm 21 deflects changing the clearance between the respective nozzles and seats, increasing the clearance on one side and decreasing it on the other. This results in a change in the balanced pressure relationship in the delivery lines 23, 24 which is directly related to the location of the arm 21 between the nozzles 27, 28. In other words, movement of the arm 21 produces a pressure differential in the delivery lines 23, 24.

By making the respective delivery lines, orifices and nozzles identical, it will be appreciated that a symmetrical pneumatic circuit is provided in the bridge section 11 which affords several important advantages in the novel transducer 10. In the first place, pressure changes in the supply line 22 do not affect the accuracy of the novel bridge section 11 since the pressure in both delivery lines or legs 23, 24 change in the same manner. Thus, while the total power or air consumption of the transducer 10 may vary, nevertheless the "null" or balance point in the symmetrical bridge remains the same. In the same fashion, the accuracy of the symmetrical bridge is not affected due to temperature changes, since both legs change in the same manner.

Symmetry in the bridge section 11 also essentially prevents inaccuracy due to contamination of the air supply. It is well known that oil and water vapors are very difficult to completely remove from compressed air systems. Moreover, these vapors condense at points of moderate pressure drop and the resulting accumulation tends to collect atmospheric dust and thereby further alter the pressure drop. The restriction created by each of the respective orifices 25, 26 and nozzles 27, 28, of course, produces such a pressure drop where oil, water and dust tend to accumulate. However, the accuracy of the illustrative transducer 10 is not altered even when supplied with a contaminated air supply since the symmetrical flow pattern evenly distributes the contaminants in each leg of the bridge section 11.

Figure 7:
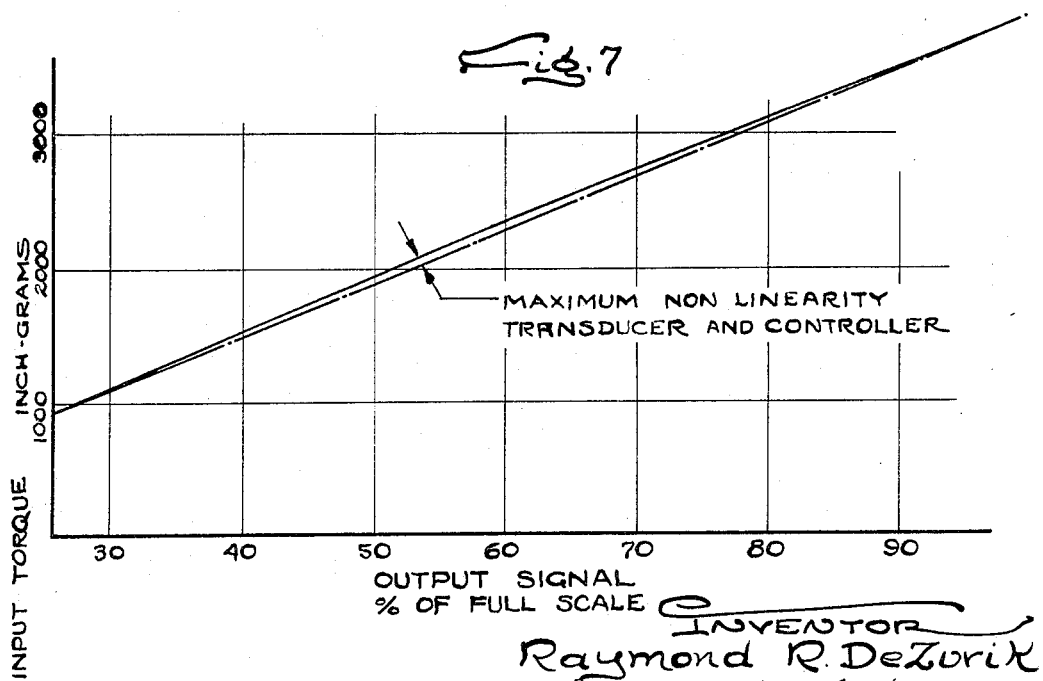
FIG. 7 is a graph illustrating the essentially linear output characteristics of the present invention.

It is another feature of the present invention that the bridge section 11 of the illustrative transducer 10 has a nearly linear output since both legs are varied simultaneously, but in opposite directions. Ordinarily, variable pneumatic nozzles cannot be readily constructed to achieve linear outputs, as will be appreciated by those skilled in the art. A typical curve illustrating the direct nozzle characteristics in terms of nozzle pressure drop in p.s.i. plotted against nozzle clearance in thousandths of an inch for a conventional nozzle flapper arrangement is illustrated in FIG. 6. However, linearity in the novel transducer 10 is achieved by operating the nozzles 27, 28 over only a small portion of their characteristic curve and amplifying the output signal in the booster pilot section 13 of the transducer. The symmetrical pneumatic circuit in the bridge section 11, where both legs are varied simultaneously but in opposite directions, thus provides a nearly linear output signal. Moreover, using a balanced bridge circuit in this way requires only one half as much movement for the same pressure change. A graph illustrating the nearly linear output signal P in terms of percent of "full scale" is shown in FIG. 7.

Accuracy of the novel transducer 10 is another important feature resulting from the symmetrical arrangement in the bridge section 11. The bridge type measurement which is provided in the present instance is inherently accurate because it functions on a "null" balance principle. As the "null" position is approached, the indicating device 17 may be made more and more sensitive regardless of the level of power supplied to the bridge section 11. Thus, the gain or amplification in the booster section 13 can be made very high, as long as deviation from the 'null' position is kept very small. Conversely, as long as the gain can be very high, the movements of the input arm 21 can be kept very small.

Maximum sensitivity in the bridge section 11 is also afforded by making the pressure drop across each of the restrictions defined by the orifices 25, 26 and nozzles 27, 28 substantially equal when the bridge is balanced or at null condition. This can readily be accomplished in the transducer 10 by simply adjusting the clearances of the nozzles 27, 28 to provide equal pressure drops to the fixed orifices 25 and 26. This insures that the operating point of the nozzles 27, 28 is near the optimum point on the typical curve shown in FIG. 6.

Conventional nozzle-flapper systems ordinarily require flapper movements on the order of about .002 inch at the nozzle. As previously pointed out these conventional nozzle-flapper systems have a non-linear characteristic output curve as illustrated in FIG. 6. In the present system, however, the range of movement of the input arm 21 is in the range of only about .0001 inch of movement between the nozzles 27, 28. This very small range of movement insures that the input torque T produces a flapper movement which occurs only over the linear portion of the curve illustrated in FIG. 6.

Amplification of the differential pressure in the delivery lines 23, 24 resulting from the position of the input arm 21 between the nozzles 27, 28 is provided in the booster pilot section 13 of the transducer. For this purpose, the delivery lines 23, 24 intermediate the respective orifices 25, 26 and nozzles 27, 28 are formed with Y junctions 31 and 32 respectively coupled to branch lines 33 and 34. The Y junctions 31, 32 are so formed that the resulting pressure in the branch lines 33, 34 reflects the relative pressure drop between the respective orifices and nozzles adjacent the ends of the Y junctions.

In the preferred embodiment, the differential pressure amplifier 15 is formed with two equal chambers 41 and 42 coupled to the respective branch lines 33, 34. Within the amplifier 15, the chambers 41, 42 surround a bi-directional spool piece 43 formed with an annular enlargement 44 defining a piston-like portion 45 and 46 adjacent each of the respective chambers 41, 42. Thus, when a pressure differential is communicated to the chambers 41, 42, the spool piece is moved in the direction away from the chamber having the higher pressure value.

Movement of the spool piece 43 operates to directly alter the clearance of the booster pilot valve 16. As shown in more detail in FIG. 3, the pilot valve 16 includes an orifice 47 defining a valve seat for a valve needle 48 carried by the spool piece 43. Thus, as the spool piece 43 moves due to a differential pressure in the chambers 41, 42, the needle valve 48 is repositioned with respect to the orifice 47 in the pilot valve. A supply line 55 is coupled to the amplifier to communicate a constant pneumatic pressure from the source 16a indicated in FIG. 1 to the amplifier 15 and pilot valve 16. In this regard, it will be understood that the source 16a may be joined with the source 14a to provide a single source of pneumatic pressure for the transducer 10. After passing through the valve orifice 47, the air flow from the supply line 55 is subsequently vented to the atmosphere through a bleed orifice 58 and the variable output pressure signal P is delivered through the output line 60.

Pursuant to another feature of the present invention, the positioning of the valve needle 48 takes place with no measurable error because of the extremely low spring rate in the differential pressure amplifier 15. This extremely low spring rate is achieved by suspending the spool piece 43 within the amplifier 15 by a series of flexible, resilient diaphragms 49, 50, 51 and 52. It will also be understood that the diaphragms 49, 50 define the end walls of one differential pressure chamber 41, and similarly, the diaphragms 51, 52 define the end walls for the other differential pressure chamber 42. Thus, all moving parts within the differential pressure amplifier 15 are suspended by the flexible diaphragms 49–52 so that no sliding friction or surface contact occurs with the spool piece 43. This results in a device that has unusually low hysteresis and results in an extremely high gain for the pressure amplifier 15 and accurate positioning of the needle valve 48 in the pilot valve 16.

Another important feature feature of the differential pressure amplifier 15 is the method of stabilizing the spool piece 43. This is accomplished by delivering air under pressure from the source 16a to each end of the spool. For this purpose, the amplifier 15 also defines a second pair of pressure chambers 53 and 54 each of which surround one end of the spool piece 43. The supply line 55 also communicates air under pressure to the chambers 53, 54, and thus against each end of the spool 44. The pressure in the chambers 53, 54 acts very much like a perfect spring on each end of the spool piece 43 to thereby stabilize the spool piece and prevent flutter and vibration of the needle valve 48. It will also be understood that this is accomplished without introducing any mechanical spring rate into the differential pressure amplifier 15.

Hysteresis is also essentially eliminated from the pilot valve 16 by arranging the needle valve 48 in such a way that physical contact with the orifice 47 is avoided during normal operation. As shown in FIG. 3, the needle valve 48 is desirably coaxially mounted adjacent one end of the spool piece 43 and biased toward the orifice 47 by means of a small compression spring 57. The spring 57 is in a static condition during normal operation and the needle valve 48 will contact the orifice 47 only during shut-down. When this happens, the needle 48 is protected from being damaged by compressing the spring. The spring pressure also centers the needle 48 when normal operation resumes.

Desirably, the atmospheric bleed orifice 58 is arranged coaxially with the valve orifice 47 so that the flow of pressurized air from the chamber 53 out through the orifice 47 tends to blow out any contamination. Moreover, any surface films that may collect on the orifice 47 are compensated for automatically. When the output from the booster pilot tends to change due to contamination, this change is also sent back to the negative feedback 18 and positive feedback 19 devices in the force balance section 12 of the transducer. The bridge detector then repositions the booster pilot for a corrected output signal. This repositioning of the booster pilot takes place with no measurable error because of the extremely low spring rate of the device.

In a similar fashion, the booster pilot does not introduce errors into the output as a result of supply pressure variations in the supply line 55. This again is due to the extremely low spring rate in the spool piece 43. Any change in the booster pilot output due to supply pressure variations is delivered to the force balance section 12 in the same manner as changes due to contaminants. The resultant unbalance in forces is picked up in the bridge section 11 and the pilot valve stem 48 is repositioned in order to restore the balanced condition.

The pneumatic output signal P is delivered from the booster pilot valve 16 through an output line 60 located downstream from the valve orifice 47. It will now be seen that the level of the output signal P with respect to the supply pressure in the input line 55 is directly dependent upon the pressure differential in the chambers 41, 42 communicated from the bridge section 11 of the transducer. In the preferred embodiment, the amplifier 15 is arranged to produce a full range of output signals, for example 3–15 p.s.i. output, for as little as a 0.2 p.s.i. change in the pressure differential. Thus, the differential pressure need only change about 1½% to produce a full change in the signal output level and the amplifier unit has an extremely high gain of about 75. This results in a full excursion of the signal output P for very minute nozzle pressure changes. In this way, the nozzles may be operated over only a small portion of the linear part of their characteristic curve as shown in FIG. 6, and the non-linearity of the output signal P is minimized as shown in FIG. 7.

Turning now to the force balance section 12 of the novel transducer 10, it will be seen that the pneumatic output line 60 divides into two feeder lines 61 and 62 coupled respectively to the negative feedback mechanism 18 and the positive feedback mechanism 19. The negative feedback mechanism defines an air cylinder 63 in which a movable piston 64 is mounted in air-tight relationship. An operating rod 65 couples the piston 64 directly to the input arm 21 in the bridge section 11 of the transducer 10. It will be appreciated that as the output signal P increases in the output line 60 and line 61 as a result of the application of an input torque T on the arm 21, the piston 64 is urged toward the right as seen in FIG. 2 by the increased pressure in cylinder 63 and the rod 65 acts to return the arm 21 toward the original null or balance position.

The incorporation of the negative feedback device 18 between the output signal P and the input torque T serves to complete the closed loop circuit for the transducer 10. Desirably, the negative feedback 18 functions to establish a substantially 100% balance of the input torque T and the signal output pressure P. In this way, the input and output are being constantly compared and any errors generated within the internal components, such as in the booster pilot section 13, are continuously corrected.

In the preferred embodiment, the piston 64 is mounted in the cylinder 63 of the negative feedback device 18 on a resilient convoluted diaphragm 66. This keeps the spring rate in the negative feedback device 18 to a minimum and also eliminates critical location problems. Furthermore, as more clearly shown in FIG. 4, the piston 64 is prevented from physically contacting the air cylinder 63 and thus sliding friction and hysteresis are maintained at minimum values. In addition, the diaphragm 66 also eliminates temperature errors since any expansion in the connecting rod 65 will simply reposition the diaphragm 66 against the air cushion in the cylinder 63 without changing any of the forces involved. It will be understood, however, that a metal bellows may be utilized in place of the resilient diaphragm 66 without departing from the present invention.

The combination of the positive feedback device 19 and a viscous damper 67 into a single unit is another important feature of the present invention. This combination of positive feedback and damping action in the force balance section 12 permits the negative feedback device 18 to achieve a substantially 100% balance between input and output without becoming unstable. Stability, of course, is important due to the extremely high gain achieved in the differential pressure amplifier 15 and the rapid response of the negative feedback device 18. In the present instance, additional stability is also achieved by damping the frequency of the input force and the negative feedback force as well as the positive feedback force. This is accomplished by directly damping the movement of the input arm 21 which occurs in response to changes in either the input torque or the negative feedback force applied thereto.

As shown in FIG. 5, the positive feedback device 19, similar to the negative feedback device 18, defines an air cylinder 73 in which a piston 74 is mounted in fluid-tight relation. The damping device 67 also includes a piston 75 which is coupled to the input arm 21 by means of an operating rod 76. Between the pistons 74, 75 the damping device 67 defines a pair of fluid-tight chambers 77 and 78 interconnected by a passageway 79 and a restricted orifice 80. Preferably the chambers 77 and 78 are completely filled with an incompressible damping fluid such as glycerine or silicone damping compound which may be poured into the damper 67 through an enlarged passageway 81 after a plug 82 has been removed.

By coupling the positive feedback mechanism 19 through the viscous damper 67 to the input arm 21, a delay function is introduced in the application of the maximum positive feedback force. It will also be understood by those skilled in the art that the positive feedback mechanism defines an integrating function. Moreover, changing the size of the orifice 80 in the damper also changes the integrating action in the same direction thereby maintaining a balance between both the damping and integrating action. In addition, changes in the length of the lever arm M through which the push rod 76 operates also varies both damping and inverse derivative action simultaneously. On the other hand, the ratio of the effective areas of the negative feedback element 18 and the viscous damper 67 are desirably preset for optimum performance of the transducer 10. Preferably, this should be a permanent ratio that cannot be accidentally changed from its optimum condition.

Errors due to temperature variations in the positive feedback device 19 and viscous damper 27 are also essentially eliminated in the preferred embodiment by mounting the pistons 74, 75 on resilient convoluted diaphragms 83 and 84, respectively, as shown in FIG. 5. Thus, any expansion of the push rod 76 or damping fluid within the viscous damper will merely reposition the diaphragms against the air cushion in the cylinder 73 without changing any of the forces involved. Moreover, since these changes are generally gradual, damping fluid can flow through the orifice 80 without introducing any measurable change in the forces. This same air cushion allows the viscous damper 67 to be mounted a non-critical distance from the torque arm 21. Alternatively, of course, metal bellows may be utilized in some instances where a spring rate in the positive feedback and damping units is not critical or may even be desirable.

The orientation and arrangement of the enlarged filling passageway 81 with respect to the restricted orifice 80 and passageway 79 is also important. Desirably, the viscous damper 67 is installed so that the plug 82 is in the uppermost position. If sufficient viscous damping fluid is then added to the damper 67 to bring the level of the fluid well up into the passageway 81, the chambers 77 and 78 will be completely filled and the orifice 80 will be entirely submerged in the damping fluid. Moreover, any air bubbles that tend to work out of the damping fluid will move toward the top of the passage 81 where they will not interfere with the operation of the damper 67.

Another important feature of the transducer 10 is the ease in which the sensitivity may be adjusted. The sensitivity adjustment is made by changing the length of the lever arm L through which the push rod 65 of the negative feedback device 18 operates. (See dash line portion of FIG. 2.) Desirably, this is a mechanical adjustment and therefore very positive. Once set, it will maintain exact adjustment throughout the range of operating conditions and it is not subject to fouling or wear. It will be understood, of course, that this adjustment may be either a continuous or a step adjustment by selection of the specific mechanical details.

From the foregoing, the many advantages of the novel transducer 10 will now be appreciated. Due to the symmetrical arrangement of the bridge section 11, very small movements of the input arm 21 are required to produce a pressure differential in the branch lines 33, 34. Moreover, symmetry in the bridge section substantially prevents errors due to temperature changes, supply pressure variations or contaminants that may enter the supply line 22, since the supply air is evenly distributed through each branch of the bridge section.

Errors in the booster pilot section are also essentially eliminated due to the fact that the spool piece 43 is mounted on convoluted diaphragms that eliminate mechanical friction within the differential pressure amplifier 15. Moreover, the differential pressure amplifier is constructed so as to have very low spring rates since an air cushion is provided at each end of the spool piece to automatically center the spool upon an equilization of pressure. These two features of substantially no hysteresis and extremely low spring rate in the amplifier 15 also materially contribute to the high gain which is achieved in the transducer 10. In addition, due to the balanced nature of the chambers surrounding the spool piece 43, errors due to supply pressure variations, temperature changes, or contaminants that may enter the supply line 55 are also essentially eliminated in the same manner as in the bridge section 11.

The build-up of contaminants in the booster pilot valve 16 is also avoided by the incorporation of the external bleed orifice 58 aligned with the pilot valve orifice 47. The air flow through the orifice 47 is directed out through bleed orifice 58 and thus blows any contaminants, which may tend to collect at this point of moderate pressure drop, away from the needle valve 48 and orifice 47. In response to movement of the spool piece 43 resulting from the communication of differential pressure to the amplifier 15, the needle valve 48 changes the restriction 47 in the pilot valve 16. This, of course, alters the flow of supply air from line 55 so that the output signal P corresponds directly with movements of the input arm 21.

In the force balance section 12, the negative feedback device 18 and positive feedback device 19 and viscous damper 67 are also constructed so as to eliminate errors due to supply pressure variations or temperature changes. Furthermore, the movable pistons in each of these devices are supported by resilient convoluted diaphragms which not only introduce a very low spring rate into these devices but also essentially eliminate sliding friction and hysteresis. Finally, the combination of the viscous damper 67 with the positive feedback device 19 permits the negative feedback device 18 to function with a greater sensitivity, higher gain and a greater percentage of force balance without becoming unstable due to input fluctuations.

I claim as my invention:

1. A force-to-pneumatic pressure transducer including a swingable input arm having a portion thereof mounted between a pair of opposed air discharge nozzles so that movement of said arm relative to said nozzles affects both the discharge of air therefrom and the pneumatic pressure upstream from said respective nozzles due to the application of an external force on said arm, comprising, in combination, means for amplifying the resulting differential pneumatic pressure upstream from said nozzles, negative feedback means for utilizing said amplified pressure to oppose said external force on said arm, positive feedback means for utilizing said amplified pressure to aid said external force on said arm, said negative feedback means exerting a force on said arm through a greater effective lever arm than said positive feedback means, damping means associated with said positive feedback means for delaying the application of the force on said arm from said position feedback means with respect to said negative feedback means, and for damping movements of said arm, said delayed force application being integral to provide a reset function when applied to said positive feedback means and derivative to provide a rate function when applied to said negative feedback means, and other means for utilizing said amplified pressure as a linear indication of the external force applied to said input arm.

2. A force-to-pneumatic pressure transducer according to claim 1 wherein said positive feedback means and said damping means have a unitary body portion formed with a pair of chambers interconnected by a passageway having a restricted orifice therein, a piston mounted in each of said chambers in fluid-tight relationship, said chambers and passageway adapted to enclose an incompressible fluid between said piston, means for coupling one of said pistons to said input arm whereby movement of said arm with respect to said nozzles is retarded by the restricted flow of fluid through said orifice, and means for communicating said amplified pneumatic pressure to the opposite side of said other piston so that fluid is urged through said orifice and against said one piston coupled to said input arm in response to an increase in said amplified pneumatic pressure.

3. A force-to-pneumatic pressure transducer according to claim 2 wherein each of said pistons is mounted within said respective chambers on a flexible diaphragm to avoid sliding contact between said pistons and said chambers thereby minimizing mechanical friction within said unitary positive feedback and damping means.

4. A force-to-pneumatic pressure transducer according to claim 2 wherein said unitary body of said positive feedback and damping means also defines an enlarged passageway extending upwardly from said orifice to the outer surface of said body so that said fluid in said enlarged passageway serves as a reservoir above said submerged orifice and so that air bubbles entrapped in said fluid are dispersed through said enlarged upwardly extending passageway.

References Cited by the Examiner
UNITED STATES PATENTS

| | | | |
|---|---|---|---|
| 2,630,824 | 3/1953 | Eckman. | |
| 2,747,595 | 5/1956 | Dickey | 137—82 |
| 3,064,627 | 11/1962 | Blanton | 91—433 X |
| 3,064,675 | 11/1962 | Johnson | 251—54 X |
| 3,101,650 | 8/1963 | Blanton | 137—625.64 X |
| 3,104,810 | 9/1963 | Lupfer | 137—86 X |
| 3,121,440 | 2/1964 | Heller | 137—85 |

WILLIAM F. O'DEA, *Primary Examiner.*

ALAN COHAN, *Examiner.*